Feb. 22, 1955   V. P. M. BALLU   2,702,438
SCOOP ATTACHMENT FOR FARM-TYPE TRACTORS
Filed Feb. 17, 1948   2 Sheets-Sheet 1
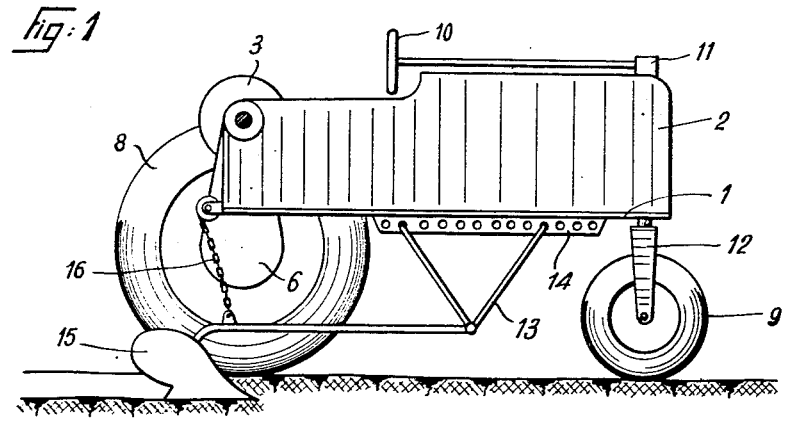
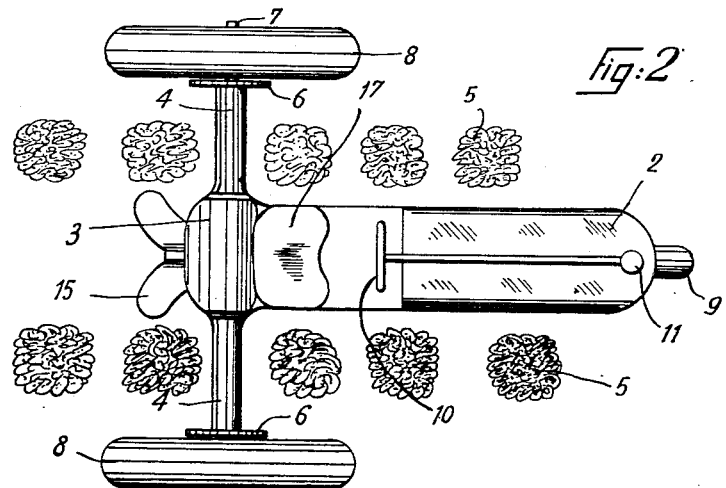
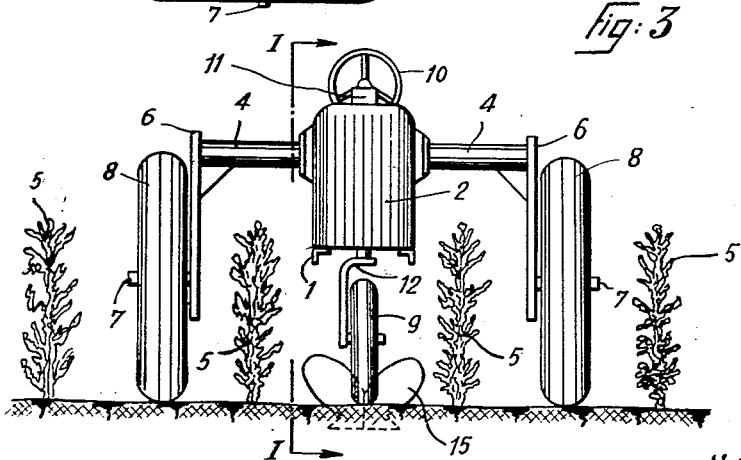

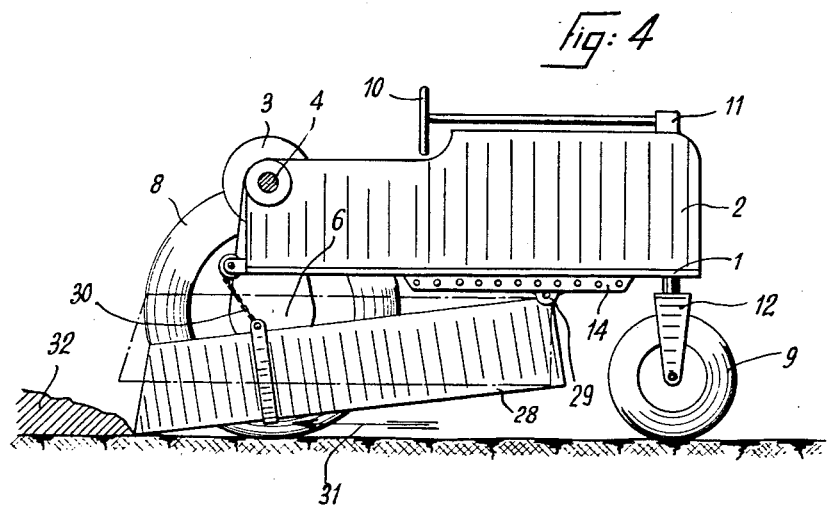
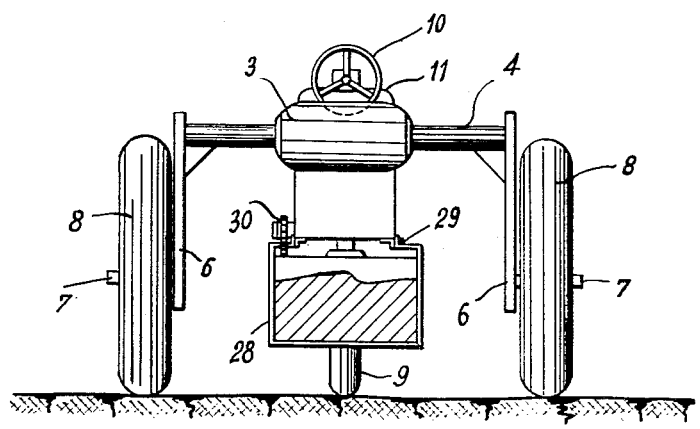

United States Patent Office 2,702,438
Patented Feb. 22, 1955

2,702,438

SCOOP ATTACHMENT FOR FARM-TYPE TRACTORS

Vincent P. M. Ballu, Epernay, France, assignor to Etablissements Edgar Brandt (Societe Anonyme), Paris, France, a company of France Application February 17, 1948, Serial No. 8,877
In France April 9, 1946

Section 1, Public Law 690, August 8, 1946
Patent expires April 9, 1966

4 Claims. (Cl. 37—126)

The object of the present specification is to provide a wheeled tractor, designed more particularly for vine cultivation, of which the driving wheels travel in two spaces included between different rows of vines, these spaces leaving between them at least one free space in which at least one steering wheel of the tractor may run.

The tractor of the invention has greater stability than conventional tractors designed to span a single row of vines, owing to its wider gauge and to the relatively low position of its center of gravity since the engine as well as various implements may be supported at a height lower than that of the vines, in the free space between the driving wheels.

The tractor, according to the invention, is powered in such a way that the actual heavy work may be performed in the space or spaces included between the driving wheels, especially in the one where the steering wheel runs while light work may be carried out at the same time in several rows, on each side of the tractor axis.

It may be found convenient also to load the tractor in its central portion in the lower part of its chassis with steadying weights, for instance fertilizers or some material for treating the vines, that may have to be carried to the area under cultivation. While the height of the chassis above the ground is less than that of the vines themselves, it is still sufficient to allow the stowing of panniers or tanks in which these various articles may be conveyed, the result being to give the tractor a still firmer grip on the ground.

In the drawings,

Fig. 1 is a diagrammatic elevational view of a tractor according to the invention, along line I—I of Fig. 3, one of the driving wheels having been removed for the sake of clarity.

Fig. 2 is a plan view of this tractor.

Fig. 3 is a front view thereof.

Fig. 4 is an elevational view showing in a diagrammatic way a tractor provided at its lower part with a conveyor scoop.

Fig. 5 is a rear view of the tractor fitted up as in Fig. 4.

The tractor illustrated in Figs. 1, 2 and 3 is assembled on a fairly narrow chassis 1 carrying the engine, the gear box as well as the usual fittings for this type of vehicle. All these parts are enclosed inside a casing 2. 3 is the rear axle unit which extends on both sides to form tubular housings 4 for the rear wheels driving shafts, the housings 4 being located at a height above the ground greater than that of the vine rows 5. The transmission between these shafts and the driving wheels 8 is housed inside casing 6 carrying the wheel hubs 7.

The forward part of the vehicle carries a single steering wheel 9 that may be controlled by a hand control 10 by means of a transmission 11 of ordinary type. The wheel 9 itself is carried by a pivotal support 12. As shown in Fig. 3, the tractor spans two rows of vines 5, that is to say the driving wheels 8 run in two furrows between vines separated by a free furrow in which the steering wheel runs. In register with the central space included between the straddled rows of vine, the chassis may hang low enough to give a good balance to the tractor. However, as will appear hereinafter, it is advisable to keep a certain amount of free clearance under the chassis 1 for the convenience of the work.

Thus, as shown in Fig. 1, there may be fitted under the tractor, by means of a three arm support 13, the position of which may be varied by means of holes drilled in a bracket piece 14, a plough 15 of which the operating level may be regulated by means of a chain 16. This chain is associated with a lifting member (winch, ratchet capstan, lever) placed near the driver's seat.

As shown in Figs. 4 and 5, there may be suspended under the chassis of the machine, a receptacle 28 designed to carry heavy material, for instance earth or fertilizer. This receptacle is hooked at the front to a hanger 29 about which it may swing and at the rear to a strong lifting chain 30 that may be, for instance, the same as that used for ploughing work. With the receptacle slung in a horizontal position, as shown in Fig. 5, and closed at its rear end, the tractor is converted into a transport truck.

Fig. 4 shows how the loading of this scoop arrangement may be effected: all that has to be done is to release the lifting arrangement and shift the tractor in reverse motion, in the direction of the arrow 31 towards the pile 32 of material to be carried. The scoop then works like a shovel for picking up off the ground the material with which it has to be loaded. When moving forward in the ordinary way, this scoop may also be kept in a sloping position and act as a spreader, in the case of a fertilizer for instance. This scoop receptacle may also be designed as an ordinary tank for distributing fertilizer through the agency of a feeder of usual type.

What I claim is:

1. An agricultural device comprising a longitudinal structure, power means carried by the body structure, a front steering wheel supported from said body structure in the vertical mid-plane thereof, rigid crank-shaped means fast with said body structure on either side and at the upper part thereof in a plane transverse thereto, a rear drive wheel rotatably supported on said last means in dropped position laterally with respect to said body, a mounting member depending from the body structure and extending axially thereof at the vertical mid-plane, said mounting member including an elongated bar having longitudinally spaced transverse apertures and said member being positioned slightly rearwardly of the front wheel and extending to a point spaced considerably forward of the rear wheels, a scoop arranged longitudinally of the tractor and supported at its front end from the mounting member, means cooperating with said apertures for adjustably attaching said scoop to the mounting member for pivotal movement about an axis transverse to the body structure and located between the axes of the front and rear wheels, said scoop having a closed front end and open rear end and the center of gravity of the scoop lying in the vicinity of the center of gravity of the body structure and between the axes of the front and rear wheels and means depending from the rear portion of the body structure adjustably suspending the rear portion of the scoop so that the scoop is adjustably declined rearwardly of the body structure.

2. An agricultural tractor comprising a longitudinal structure, power means carried by the body structure, a front steering wheel supported from said body structure in the vertical mid-plane thereof, rigid crank-shaped means fast with said body structure on either side and at the upper part thereof in a plane transverse thereto, a rear drive wheel rotatably supported on said last means in dropped position laterally with respect to said body, a mounting member depending from the body structure and extending longitudinally thereof, spaced mounting means on said member distributed therealong at fixed points, the foremost of which is positioned slightly rearwardly of the front wheel and the rearmost of which is spaced considerably forward of the rear wheels, a scoop arranged longitudinally of the tractor below said mounting member and supported at its front end from one of said mounting means for pivotal movement about an axis transverse to the body structure and located between the axes of the front and rear wheels, said scoop having a closed front end and open rear end and the center of gravity of the scoop lying in the vicinity of the center of gravity of the body structure and between the axes of the front and rear wheels and means depending from the rear portion of the body structure adjustably suspending the rear portion of the scoop so that the scoop is adjustably declined rearwardly of the body structure.

3. An agricultural tractor as claimed in claim 2, wherein said mounting member extends axially of the body structure at the vertical mid-plane.

4. An agricultural tractor as claimed in claim 2, wherein said mounting member includes an elongated bar having longitudinally spaced transverse apertures forming said spaced mounting means.

References Cited in the file of this patent

UNITED STATES PATENTS

| | | |
|---|---|---|
| Re. 12,997 | Waddell | July 27, 1909 |
| 685,896 | Wise | Nov. 5, 1901 |
| 1,015,488 | Hadsel | Jan. 23, 1912 |
| 1,407,486 | Sandberg | Feb 21, 1922 |
| 1,449,138 | Bartholomew | Mar. 20, 1923 |
| 1,624,210 | Bruce | Apr. 12, 1927 |
| 1,706,742 | Raimer et al. | Mar. 26, 1929 |
| 1,890,450 | Altgelt | Dec 13, 1932 |
| 2,209,804 | Ashley | July 30, 1940 |
| 2,247,668 | Rosenthal | July 1, 1941 |
| 2,254,292 | Jones | Sept. 2, 1941 |
| 2,254,360 | Frudden et al. | Sept. 2, 1941 |
| 2,332,752 | Ratcliff | Oct. 26, 1943 |
| 2,370,347 | Goebel | Feb 27, 1945 |
| 2,412,146 | Hansen | Dec 3, 1946 |
| 2,448,074 | Bishop | Aug. 31, 1948 |
| 2,474,094 | Colquitt | June 21, 1949 |
| 2,484,201 | Winchell | Oct. 11, 1949 |
| 2,505,202 | Peterson | Apr 25, 1950 |
| 2,528,550 | Robb | Nov. 7, 1950 |

FOREIGN PATENTS

| | | |
|---|---|---|
| 664,379 | France | Apr. 23, 1929 |